United States Patent Office 3,019,342
Patented Jan. 30, 1962

3,019,342
MOISTURE DETECTION
Jesse M. Brooke, Sweeny, Tex., assignor to Phillips Petroleum Company, a corporation of Delaware
No Drawing. Filed June 20, 1958, Ser. No. 743,507
3 Claims. (Cl. 250—106)

This invention relates to moisture detection. In one of its aspects the invention relates to a method of determining the moisture content of a hydrocarbonaceous, or other fluid, by contacting said fluid with a metal carbide capable of reacting with said moisture to release acetylene and measuring the released acetylene. In another of its aspects the invention relates to the method as described except that carbides producing other measurable gases are used. Further, in another aspect, the invention utilizes a carbide containing radioactive carbon ($C^{14}$) which will be in the gas produced permitting detection and measurement of the moisture in terms of the radiation from the produced gas or gases. In a further aspect, the invention relates to determining the moisture content of a non-aqueous liquid by reaction with a carbide producing a gas, for example, acetylene, stripping the produced gas from the liquid and then measuring said gas or detecting the radiation from said gas. Further, the invention relates to a method of contacting the moisture-containing gas or liquid with the carbide in a fixed or moving bed of subdivided carbide, as in a fluidized bed, employing moving bed, or fluidized bed techniques which are known in the art and herein incorporated by reference. In an embodiment, the invention utilizes a conically shaped vessel in which there is maintained a fluidized bed of carbide with which the moisture-containing fluid is contacted and from which the gas produced is recovered and measured for the determination of moisture in the sample.

I have now found that it is possible to use a carbide as herein set forth to measure the moisture content of a fluid such as a hydrocarbon gas, vapor or liquid. Thus, I have found that I can bring together a fluid containing very small quantities of moisture and a carbide obtaining sufficient reaction releasing a gas corresponding to the carbide, for example, acetylene, that the gas produced can be measured. Furthermore, I have found that the quantity of gas produced corresponds sufficiently to the quantity of moisture present that instruments can be calibrated. Thus, although it has been reported that calcium carbide is not a satisfactory desiccant for hydrocarbons because of the formation of a layer of calcium hydroxide forming thereon, causing the reaction rate to fall off because the layer prevents the water from coming into contact with the carbide, I have found that approximately 50 percent of the water present will react in a fairly short time. Thus, I have found that a gasoline containing 181 parts per million of water produced 98.4 parts per million of acetylene and one containing 50 parts per million of water produced 26.8 parts per million of acetylene. Therefore, the apparatus used could be calibrated. Still further, by the method provided by this invention I have found that the contact bed, if fluidized, will give very good conditions of contact, the particles of carbide rubbing against each other and sufficiently renewing their surfaces as to prevent the formation of a sufficient coating of hydroxide which will interfere with the operation desired to be conducted. Especially, by providing a conical contact bed and passing the sample gas through said bed, alone, or together with another fluid inert to the reaction, the gaseous product of which is to be measured, it is possible to operate the bed of carbide as a fixed fluidized bed. Also, when the fluid, whose moisture content is to be measured, is a liquid the liquid can be introduced as a jet into the bed of calcium carbide or in the alternative the body can be stirred to cause friction of the carbide particles of which a sufficient quantity to cause good contact between them is employed, or both.

It is an object of this invention to detect and measure moisture in a fluid. In another of its objects, the invention provides a method of determining the moisture content of a hydrocarbonaceous or other fluid. In a further object of the invention, a carbide producing a measurable or detectable gas is used in detecting moisture in a hydrocarbonaceous or other fluid. In a further object of the invention, a method is provided which circumvents the formation of non-reactive layers of moisture-reacted material upon carbides preventing further effective reaction thereof with moisture in a sample in which moisture is being detected and measured. In a further object of the invention, importantly, a carbide containing radioactive carbon is used to detect and to measure moisture in a sample containing the same.

Other aspects, objects, and the several advantages of the invention are apparent from this disclosure and the appended claims.

According to the invention, the moisture content of materials is measured by contacting such materials with a carbide compound capable of releasing a gas such as acetylene. In one of the embodiments of the invention a compound containing a tagged carbon, e.g., carbon-14, is caused to react with moisture in the material, whose moisture content is being detected and measured, following which the radiation emanating from gas produced by the reaction with the moisture is measured.

In its now preferred form, the invention contemplates the use of such carbides as $Na_2C_2$, $K_2C_2$, $Rb_2C_2$, $Cs_2C_2$, $Li_2C_2$, $MgC_2$, $SrC_2$, $CaC_2$, and $BaC_2$. Other carbides can be used which produce gases other than acetylene, but those carbides producing acetylene and those which are not explosive when contacting water are now preferred.

The invention is especially useful in measuring trace quantities of water in liquid and gaseous hydrocarbonaceous materials such as hydrocarbon vapors and liquid light hydrocarbons.

The preferred carbide is now calcium carbide which is tagged with $C^{14}$ carbon. The acetylene-containing effluent is passed through a beta-radiation detector which is calibrated to indicate the amount of moisture which is in the sample, thus obtaining a direct reading.

As indicated, contact of the moisture-containing fluid can be effected in a fixed bed or in a fixed fluidized bed of the solid carbide. Further, as indicated, the use of a conical vessel or a vessel so shaped that the fluid entering the same will cause the bed of subdivided solid carbide to be fluidized is helpful in overcoming the inactiveness of the reacted carbide which might result from the laying down of a layer of the hydroxide, e.g., $Ca(OH)_2$, on the carbide, $CaC_2$.

When charging a vapor stream, the effluent containing the tagged acetylene can be used in its entirety in the detector-indicator.

Although operative to an extent to use the invention without first removing acetylene or other gas from the liquid, whose moisture content is being determined, it is now preferred to flash or strip out said gas and to pass said gas to the detector-indicator.

One skilled in the art in possession of this disclosure can routinely determine the best stripping or separating conditions which are applicable to concentrate the gas produced, e.g., acetylene, before detecting its radiation. One method comprises passing the liquid downwardly over an inert packing in a small column, at a constant rate of flow, and passing nitrogen or other inert gas at a constant rate into the bottom of the column, flowing upwardly said nitrogen or inert gas countercurrently to the liquid hydrocarbon. The overhead will comprise nitrogen or other inert gas and the tagged gas produced by the reaction with the carbide, for example, tagged acetylene. The overhead is cooled, for example, by a propane cooler in which propane is evaporating, to knock out light hydrocarbons leaving a, say, nitrogen-acetylene stream to be charged to the beta-radiation instrument for radiation detection to indicate directly on the calibrated instrument the content of moisture of the sample.

*Example*

The water content was determined in each of two gasoline samples. These samples were dosed a priori with a known quantity of water, namely, 50 parts per million and 181 parts per million, respectively. Finely subdivided solid calcium carbide was contacted with each of the two gasoline samples under conditions of agitation and produced acetylene collected and measured in a gas burette. The contact time in each of the determinations was approximately one minute. The following tabulation shows the produced acetylene in parts per million versus the water originally present in parts per million.

|  | Water | Produced Acetylene |
|---|---|---|
| Sample I | 181 | 98.4 |
| Sample II | 50 | 26.8 |

From the foregoing table, it is evident that there has been provided a method and modus operandi for the determination of moisture in fluids and accurate measurement thereof by way of a calibrated instrument, or otherwise as desired, in spite of the fact that the reaction when small quantities of water are present, of the order of trace quantities, is not entirely quantitative.

In a second operation using portions of the same gasolines containing 181 p.p.m. water and 50 p.p.m. water, respectively, but using tagged calcium carbide, $CaC_2^{14}$, and contacting in the same manner as described in the above example, the produced acetylenes, $C_2^{14}H_2$, are separately measured on a conventional beta-radiation instrument operating in a dial range of 0 to 100.

|  | Water | Dial Reading |
|---|---|---|
| Sample III | 181 | 65 |
| Sample IV | 50 | 17 |

The operation of this latter example is preferred, and the conventional beta-radiation instrument is calibrated in parts per million water. The latter operation can be used for control purposes.

Reasonable variation and modification are possible within the scope of the foregoing disclosure and the appended claims to the invention, the essence of which is that there has been provided a method of detecting and measuring moisture in fluids which comprises contacting said fluids with a carbide, preferably a carbide containing a tagged carbon, and then measuring the quantity of gas produced and/or radiation therefrom when the gas is produced with a tagged carbon-containing carbide, substantially as set forth and described, and further there has been provided a modus operandi or physical manipulative method for causing the said contacting of the said sample whose moisture content is to be detected and measured in a manner such that sufficient reaction take place that calibrated instruments can be used to read directly the moisture content of the sample.

I claim:

1. A method of detecting and measuring a small quantity of moisture in a hydrocarbonaceous fluid which comprises passing said hydrocarbonaceous fluid into a fixed fluidized bed of finely subdivided calcium carbide containing a radioactive carbon atom and detecting and measuring the radioactivity of gas thus produced.

2. A method of detecting and measuring a small quantity of moisture in a hydrocarbonaceous fluid which comprises passing said fluid into a fixed fluidized bed of a gas producing carbide containing a radioactive carbon atom and detecting and measuring the radiation in the gas thus produced.

3. A method for detecting a small quantity of moisture in a fluid material which comprises contacting said material with a moving bed of finely divided carbide containing a radioactive carbon atom and then measuring the radioactivity of the gas produced by the reaction of said carbide with the moisture in said material.

References Cited in the file of this patent

UNITED STATES PATENTS 2,752,504    McKay                June 26, 1956
2,866,690    Coyne                 Dec. 30, 1958

OTHER REFERENCES

Cooper: "C 14 Tracer Measures Fuel Distribution," article in Nucleonics, vol. 15, No. 6, June 1957, pp. 136–140.